United States Patent
Kwon et al.

(10) Patent No.: US 10,037,167 B2
(45) Date of Patent: Jul. 31, 2018

(54) MULTIPLE SCHEDULING SCHEMES FOR HANDLING READ REQUESTS

(71) Applicant: SanDisk Technologies Inc., Plano, TX (US)

(72) Inventors: Hyuk-il Kwon, Seoul (KR); YouMe Lee, Incheon (KR); SeungBeom Seo, Kyunggi-Do (KR); DongHoon Lee, Seoul (KR); ByongJun Shin, Gyeonggi-do (KR)

(73) Assignee: SanDisk Technologies LLC, Plano, TX (US)

( * ) Notice: Subject to any disclaimer, the term of this patent is extended or adjusted under 35 U.S.C. 154(b) by 273 days.

(21) Appl. No.: 14/851,717

(22) Filed: Sep. 11, 2015

(65) Prior Publication Data

US 2017/0075622 A1    Mar. 16, 2017

(51) Int. Cl.
| | | |
|---|---|---|
| G06F 12/00 | (2006.01) | |
| G06F 13/00 | (2006.01) | |
| G06F 13/28 | (2006.01) | |
| G06F 3/06 | (2006.01) | |
| G06F 9/48 | (2006.01) | |
| G06F 9/50 | (2006.01) | |
| G06F 9/38 | (2018.01) | |

(52) U.S. Cl.
CPC .......... *G06F 3/0659* (2013.01); *G06F 3/0613* (2013.01); *G06F 3/0647* (2013.01); *G06F 3/0656* (2013.01); *G06F 3/0679* (2013.01); *G06F 3/0688* (2013.01); *G06F 9/4881* (2013.01); *G06F 3/0655* (2013.01); *G06F 9/3836* (2013.01); *G06F 9/5038* (2013.01)

(58) Field of Classification Search
CPC .... G06F 3/0647; G06F 3/0655; G06F 3/0659; G06F 3/0613; G06F 3/0688; G06F 3/061; G06F 3/0679; G06F 2003/0691; G06F 9/3836; G06F 9/4881; G06F 9/5038
USPC ....... 711/103, 147, 150, 151, 152, 153, 154, 711/155, 157, 158
See application file for complete search history.

(56) References Cited

U.S. PATENT DOCUMENTS

| | | | |
|---|---|---|---|
| 2010/0091399 A1* | 4/2010 | Yoon | G06F 3/0613 360/55 |
| 2012/0159052 A1* | 6/2012 | Lee | G06F 3/0613 711/103 |
| 2014/0052906 A1* | 2/2014 | Thyagarajan | G11C 7/1072 711/105 |
| 2014/0223076 A1* | 8/2014 | Tseng | G06F 13/385 711/103 |

* cited by examiner

*Primary Examiner* — Tuan Thai
*Assistant Examiner* — Shane Woolwine
(74) *Attorney, Agent, or Firm* — Brinks Gilson & Lione

(57) ABSTRACT

A non-volatile memory system may include a controller that issues data transfer commands to have data units associated with a host read request transferred from non-volatile memory to a temporary storage area before the data is sent to a host. The controller may be configured to generate a schedule that identifies when the data transfer commands are issued. The schedule may be generated according to one of a plurality of scheduling schemes, each with a different priority in having the data units transferred to the temporary storage area. Which scheduling scheme the controller selects may depend on a queue depth of a read request queue.

18 Claims, 12 Drawing Sheets

MULTIPLE SCHEDULING SCHEMES FOR HANDLING READ REQUESTS

BACKGROUND

When a non-volatile memory system receives a host read request from a host system, the non-volatile memory system may generate one or more commands to have the data being requested retrieved from the non-volatile memory and loaded into a temporary storage area, such as random access memory (RAM), before the data is sent back to the host. Some memory systems may utilize multiple channels that can transfer data in parallel in order to enhance performance. In many situations, it may be desirable to take advantage of the multiple channels and schedule the selection of the commands in a way that aims to optimize channel throughput. However, in some situations, optimizing for channel throughput may not necessarily provide the best response time for responding to a host read request. As such, it may be desirable to have a non-volatile memory system that adapts to different situations in order to generate a schedule for issuing data transfer commands that yields an expected best overall performance even if such a schedule does not involve maximizing channel throughput.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

DETAILED DESCRIPTION OF THE PRESENTLY PREFERRED EMBODIMENTS

Overview

Figure 1A:
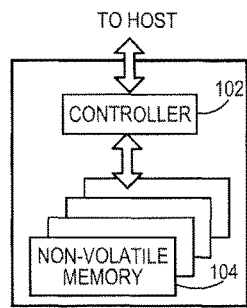
FIG. 1A is a block diagram of an exemplary non-volatile memory system.

Embodiments of the present invention are defined by the claims, and nothing in this section should be taken as a limitation on those claims.

By way of introduction, the following embodiments describe non-volatile memory systems and related methods of generating schedules for selecting data transfer commands according to one of a plurality of different scheduling schemes based on queue depth of a read request queue. In one embodiment, a non-volatile memory system may include: non-volatile memory and a controller. The controller may be configured to: receive, from a host system, a host read request to read a set of data units. The set of data units may include an initial data unit to be sent back to the host system before the other data units of the set are sent back to the host system. The controller may also be configured to generate a schedule for transferring the set of data units from the non-volatile memory to a temporary storage area that temporarily stores the set of data units before the set of data units is sent back to the host system. The schedule may prioritize the initial data unit over the other data units in the transfer of the set of data units from the non-volatile memory to the temporary storage area. Also, the controller may be configured to issue a set of data transfer commands to have the set of data units transferred from the non-volatile memory to the temporary storage area according to the schedule.

In a second embodiment, a method of a non-volatile memory system responding to a host read request may be performed. The method may include generating, with a scheduler of a controller, a schedule to transfer a set of data units associated with a host read request from non-volatile memory to a temporary storage area. The schedule may schedule an initial data unit of the set of data units to be transferred to the temporary storage before the other data units of the set, regardless of availability of a plurality of channels used to transfer the set of data units. The method may further include sending, with the scheduler, the schedule to a sequencer of the controller, and in response to receiving the schedule, issuing, with the sequencer, a set of data transfer commands to the non-volatile memory in order to have the set of data units transferred to the temporary storage area according to the schedule.

In a third embodiment, a non-volatile memory system may include non-volatile memory and a controller. The non-volatile memory may be configured to store a set of data units requested to be read by a host read request, where the set of data units comprises an initial data unit to be transferred to a host system before the other of the plurality of data units in order for the host read request to be executed. The controller may be configured to generate a schedule for transferring the set of data units from the non-volatile memory to a temporary storage area according to a first scheduling scheme when a queue depth level of a host read request queue is lower than a queue depth threshold, and generate the schedule according to a second scheduling scheme when the queue depth level of the host read request queue is higher than the queue depth threshold. The first scheduling scheme may prioritize minimizing response time in transferring the initial data unit to the temporary storage area over maximizing channel throughput for the transfer of the set of data units to the temporary storage area. The second scheduling scheme may prioritize maximizing channel throughput over minimizing the response time in transferring the initial data unit.

In some embodiments, the temporary storage area may store the initial data unit before storing the other data units based on the issuance of the set of data transfer commands according to the schedule.

In some embodiments, the non-volatile memory may transfer to the temporary storage area the initial data unit before the other data units in response to receipt of the set of data transfer commands.

In some embodiments, the schedule causes the controller to delay issuance of a data transfer command for transfer of one of the other data units on an available channel of a plurality of channels in order to prioritize the transfer of the initial data unit.

In some embodiments, the controller may delay issuance of the data transfer command on one channel until after issuance of another data transfer command for transfer of another data unit on another channel associated with the host read request in accordance with the schedule.

In some embodiments, the controller may determine which of a plurality of channels to utilize for the transfer of the set of data units in response to receipt of physical address information identifying where in the non-volatile memory the data units are located, determine back end queue depth information; and in order to generate the schedule, determine how much to delay issuance of the first data transfer command on the first channel based on the physical address information and the back end queue depth information.

In some embodiments, the schedule may be a first schedule, a read request queue may be configured to queue the host read request, and the controller may be configured to determine a queue depth of the read request queue relative to a queue depth threshold, in response to the queue depth being below the queue depth threshold, generate the first schedule, and in response to the queue depth being above the queue depth threshold, generate a second schedule that prioritizes maximizing channel throughput in the transfer of the set of data units from the non-volatile memory to the temporary storage area.

In some embodiments, the controller may to send the initial data unit back to the host system while at least some of the other data units have yet to be transferred to the temporary storage area.

Other embodiments are possible, and each of the embodiments can be used alone or together in combination. Accordingly, various embodiments will now be described with reference to the attached drawings.

Exemplary Embodiments

The following embodiments describe non-volatile memory systems and related methods of generating schedules for selecting data transfer commands according to one of a plurality of different scheduling schemes based on queue depth of a read request queue. Before turning to these and other embodiments, the following paragraphs provide a discussion of exemplary non-volatile memory systems and storage modules that can be used with these embodiments.

Of course, these are just examples, and other suitable types of non-volatile memory systems and/or storage modules can be used.

FIG. 1A is a block diagram illustrating a non-volatile memory system 100. The non-volatile memory system 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host system and transmit command sequences of context commands for read, program, and erase operations to the non-volatile memory die(s) 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the memory system 100 may be a card based system, such as a secure digital (SD) or a micro secure digital (micro-SD) card. In an alternate embodiment, the system 100 may be part of an embedded memory system.

Figure 1B:
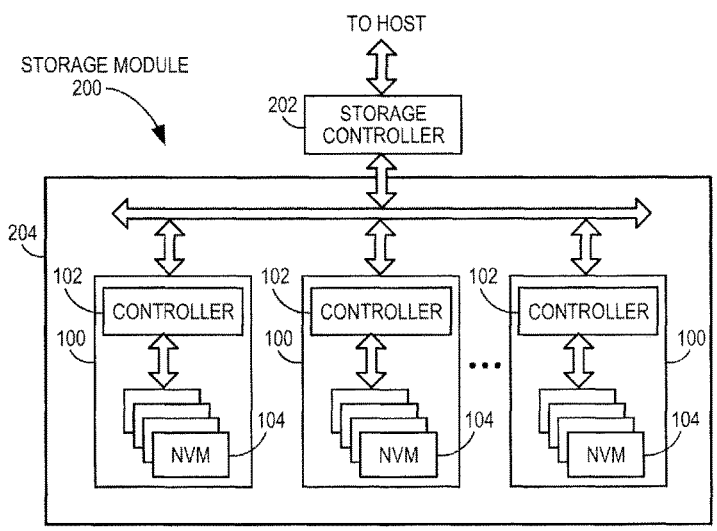
FIG. 1B is a block diagram of a storage module that includes a plurality of non-volatile memory systems.

FIG. 1B illustrates a storage module 200 that includes plural non-volatile memory systems 100. As such, the storage module 200 may include a storage controller 202 that interfaces with a host and with a storage system 204, which includes a plurality of non-volatile memory systems 100. The interface between the storage controller 202 and non-volatile memory systems 100 may be a bus interface, such as a serial advanced technology attachment (SATA), a peripheral component interface express (PCIe) interface, an embedded MultiMediaCard (eMMC) interface, a SD interface, or a Universal Serial Bus (USB) interface, as examples. The storage system 200, in one embodiment, may be a solid state drive (SSD), such as found in portable computing devices, such as laptop computers and tablet computers, and mobile phones.

Figure 1C:
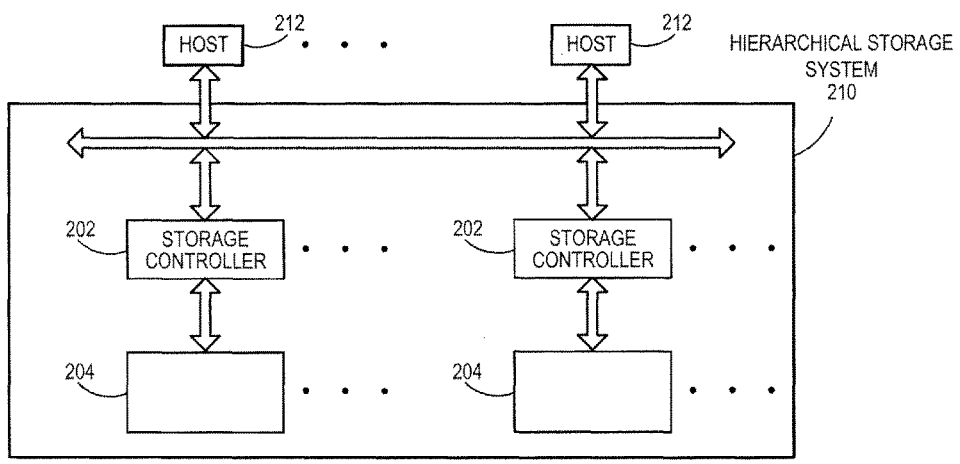
FIG. 1C is a block diagram of a hierarchical storage system.

FIG. 1C is a block diagram illustrating a hierarchical storage system 210. The hierarchical storage system 210 may include a plurality of storage controllers 202, each of which control a respective storage system 204. Host systems 212 may access memories within the hierarchical storage system 210 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the storage system 210 illustrated in FIG. 1C may be a rack mountable mass storage system that is accessible by multiple host computers, such as would be found in a data center or other location where mass storage is needed.

Figure 2A:
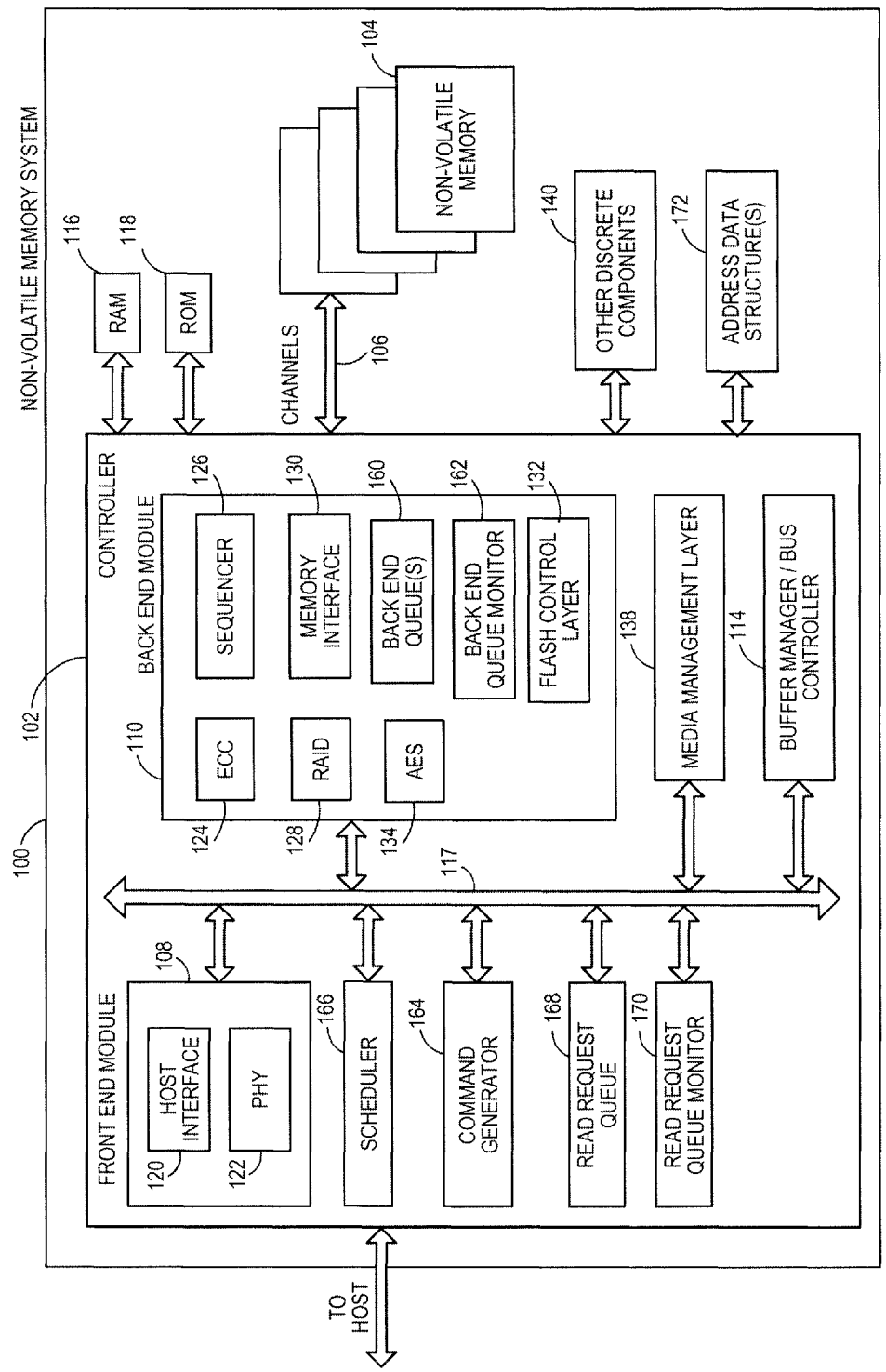
FIG. 2A is a block diagram of exemplary components of a controller of the non-volatile memory system of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory system 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus controller module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction controller (ECC) engine 124 that encodes the data bytes received from the host, and decodes and error corrects the data bytes read from the non-volatile memory 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory system 100. In some cases, the RAID module 128 may be a part of the ECC engine 124.

The back end module 110 may also include a command sequencer 126 that generates and/or issues command sequences of context commands, such as program, read, and erase context commands, to be transmitted to the non-volatile memory die(s) 104. As described in further detail below, the read context commands may include data transfer commands that are generated and issued to transfer data from the non-volatile memory die(s) 104 to the RAM 116 before the data is ultimately sent back to the host.

The commands may be queued in one or more back end queues 160 before they are selected by the sequencer and sent to the non-volatile memory die(s) 104. A back end queue monitor 162 may be configured to monitor the queue depth(s) of the back end queue(s) 160. In general, a queue depth of a queue may be and/or indicate a number of pending items to be performed, such as commands or requests, in the queue at a given point in time. The back end queue(s) and the back end queue monitor 162 are described in further detail below.

The back end module 110 may further include a memory interface 130 that provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 interface. A flash control layer 132 may control the overall operation of back end module 110.

In addition, the non-volatile memory system 100 may include one or more channels 106 between the controller 102 and the non-volatile memory die(s) 104. The memory interface 130 and the memory die(s) 104 may communicate with each other by sending the command sequences, responses, and the data on the channel(s) 106.

Figure 3:
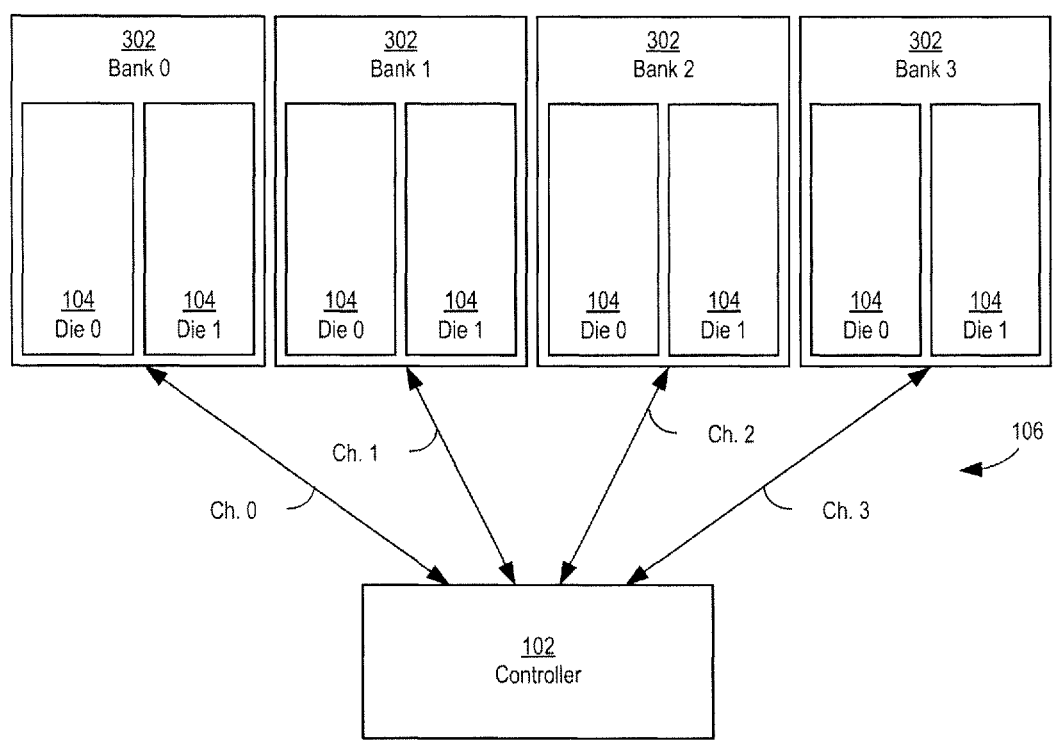
FIG. 3 is a block diagram of an example configuration of a controller in communication with a plurality of non-volatile memory dies of FIGS. 1A-1C and 2A, 2B via a plurality of channels.

FIG. 3 shows a block diagram of an example configuration of the controller 102 in communication with a plurality of non-volatile memory dies 104 via a plurality of channels 106. In some example configurations, the memory dies 104 may be configured or arranged in banks 302, with each bank including one or more dies 104. The particular example configuration shown in FIG. 3 includes four banks 302—Bank 0, Bank1, Bank 2, and Bank3, with each bank including two dies 104—a Die 0 and a Die 1. There may be a one-to-one correspondence between the banks 302 and the channels 106. Accordingly, FIG. 3 shows four channels, Ch. 0, Ch. 1, Ch. 2, and Ch. 3, being included to communicate with the four banks Bank 0, Bank 1, Bank 2, and Bank 3. The controller 102 may use the same channel to communicate with memory dies 104 configured in the same bank 302, and may use different channels to communicate with memory dies 104 configured in different banks 302. As such, which memory channel 106 that the controller 102 uses to communicate with a particular die 104 may depend on the bank 302 in which that memory die 104 is configured. Commands, responses, and data may be communicated between the controller and the memory dies 104 in parallel using two or more of channels 106 at the same time.

Example channel configurations other than the one shown in FIG. 3 may be possible. For example, there may be more or fewer than four channels and/or four banks. In addition or alternatively, the memory dies 104 may not be configured in banks and/or the number of channels used may not correspond to the number of banks. In general, multiple channels 106 may be utilized by the controller 102 to communicate in parallel with different memory dies 104.

Referring back to FIG. 2A, additional modules of the non-volatile memory system 100 may include a media management layer 138, which performs wear leveling of memory cells of the non-volatile memory die 104. The non-volatile memory system 100 may also include other discrete components 140, such as external electrical interfaces, external RAM, resistors, capacitors, or other components that may interface with controller 102. In alternative embodiments, one or more of the RAID module 128, media management layer 138 and buffer management/bus controller 114 are optional components that may not be necessary in the controller 102.

Additional modules of the non-volatile memory system 100 illustrated in FIG. 2A may include a command generator or generation module 164 that is configured to generate the command sequences and place the command sequences in the back end queue(s) 160, a scheduler or scheduling module 166 that is configured to generate schedules that the sequencer 126 may use to determine when to select and issue the commands, a read request queue 168 that queues host read requests for execution, and a read request queue monitor or monitoring module 170 that that is configured to monitor the queue depth of the read request queue 168. These modules are shown as separate from the other modules of the non-volatile memory system 100, although in other configurations, one or more of them may be part of any of the other modules.

Figure 2B:
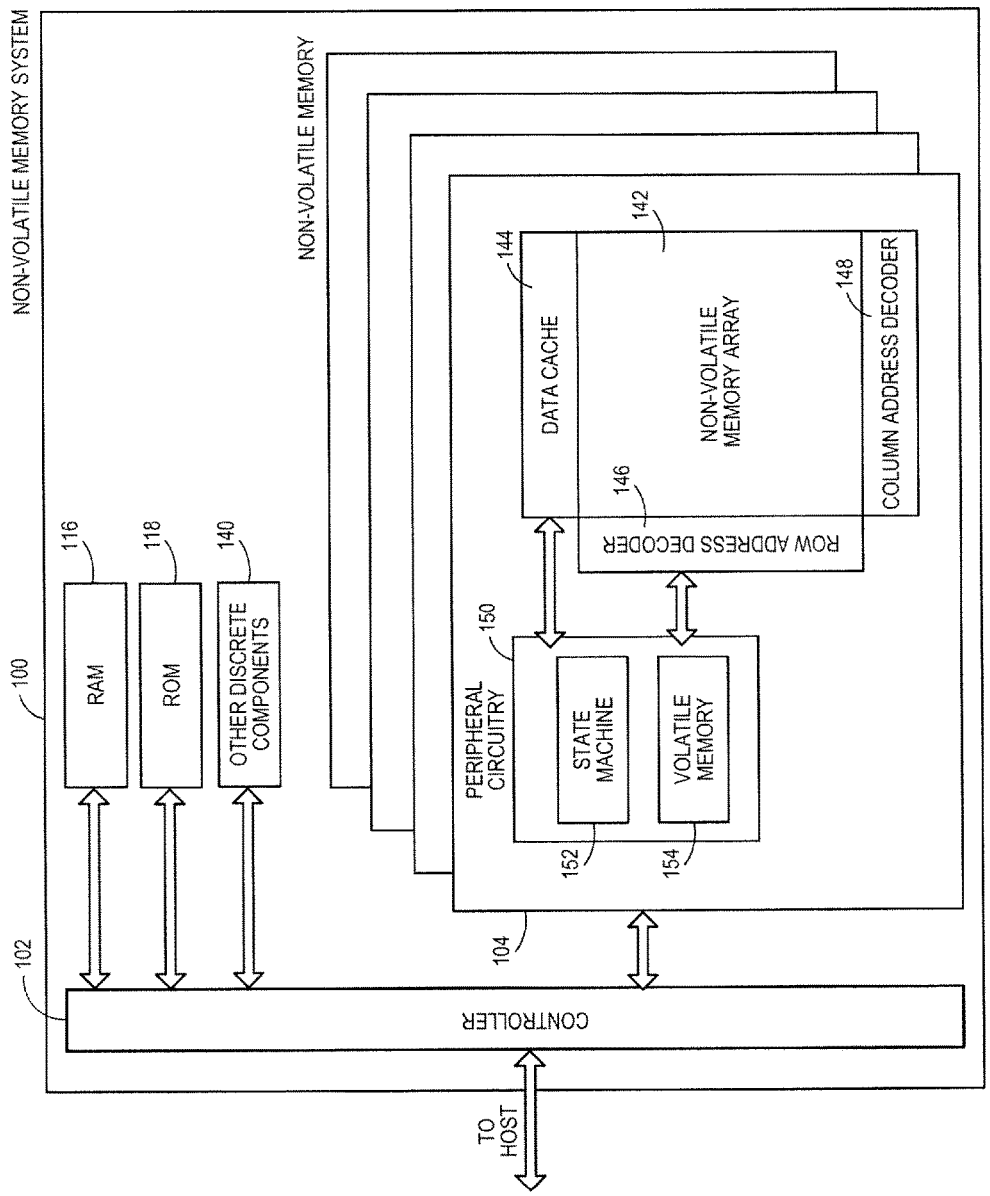
FIG. 2B is a block diagram of exemplary components of a non-volatile memory die of the non-volatile memory system of FIG. 1A.

FIG. 2B is a block diagram illustrating exemplary components of a non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, a single string may span across multiple wordlines, and the number of FGTs in a string may be equal to the number of pages in a block.

Figure 4:
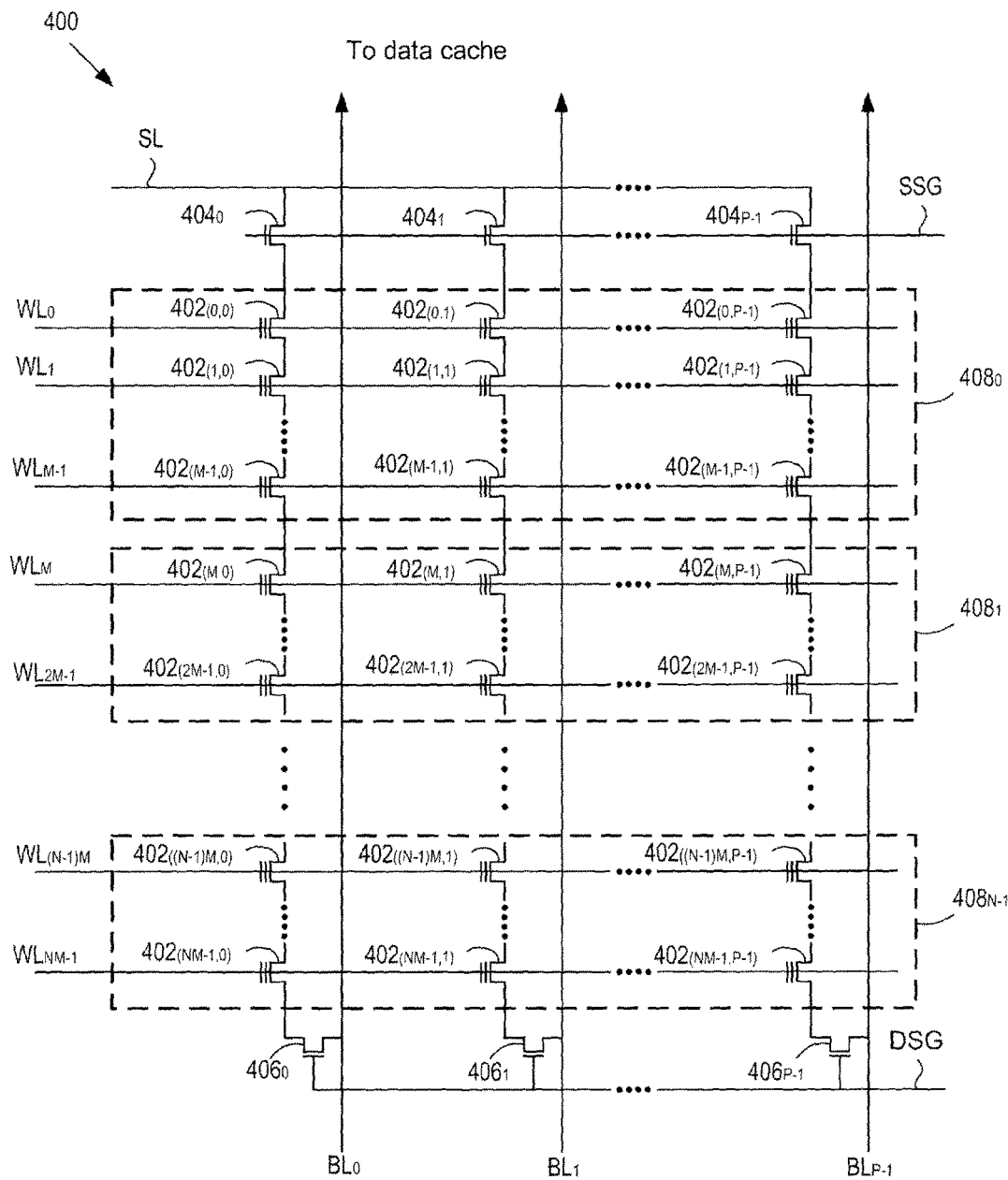
FIG. 4 is a circuit schematic diagram of an exemplary NAND-type flash memory array.

FIG. 4 is a circuit schematic diagram of at least a portion of an exemplary NAND-type flash memory array 400, which may be representative of at least a portion of the memory array 142. The memory array portion 400 may include a P-number of series-connected strings of (N times M) FGTs, each coupled to one of a P-number of bitlines $BL_1$ to $BL_{P-1}$, where N is the number of blocks $408_0$ to $408_{N-1}$ in the memory array 400, and M is the number of pages of FGTs coupled to wordlines WL in each of the N-number of blocks $408_0$ to $408_{N-1}$.

To sense data from the FGTs, a page of FGTs and a corresponding wordline may be selected, and current sensing of bitlines may be employed to determine whether a floating gate of a FGT in the selected page contains charge or not. Current that flows through a string may flow from a source line SL, through the string, to a bitline BL to which the string is coupled. The string may be coupled to the source line SL via a source select transistor, and may be coupled to its associated bitline BL via a drain select transistor. For example, a first string of FGTs $402_{(0,0)}$ to $402_{(NM-1,0)}$ may be coupled to the source line SL via a source select transistor $404_0$ that is connected to the source line SL, and may be coupled to its associated bitline $BL_0$ via a drain select transistor $406_0$. The other strings may be similarly coupled. Switching of source select transistors $404_0$, $404_1$, ..., $404_{P-1}$ may be controlled using a source select gate bias line SSG that supplies a source select gate bias voltage $V_{SSG}$ to turn on an off the source select transistors $404_0$, $404_1$, ..., $404_{P-1}$. Additionally, switching of drain select transistors $406_0$, $406_1$, ..., $406_{P-1}$ may be controlled using a drain select gate bias line DSG that supplies a drain select gate bias voltage $V_{DSG}$ to turn on and off the drain select transistors $406_0$, $406_1$, ..., $406_{P-1}$.

Referring back to FIG. 2B, the non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading or writing data to/from the memory cells in the memory array 142. The column address decoder 148 may decode a column address to select a particular group of bitlines in the memory array 142 to be electrically coupled to the data cache 144.

In addition, the non-volatile memory die 104 may include peripheral circuitry 150. The peripheral circuitry 150 may include a state machine 152 that provides status information to the controller 102. The peripheral circuitry 150 may also include volatile memory 154. An example configuration of the volatile memory 154 may include latches, although other configurations are possible.

Figure 5:
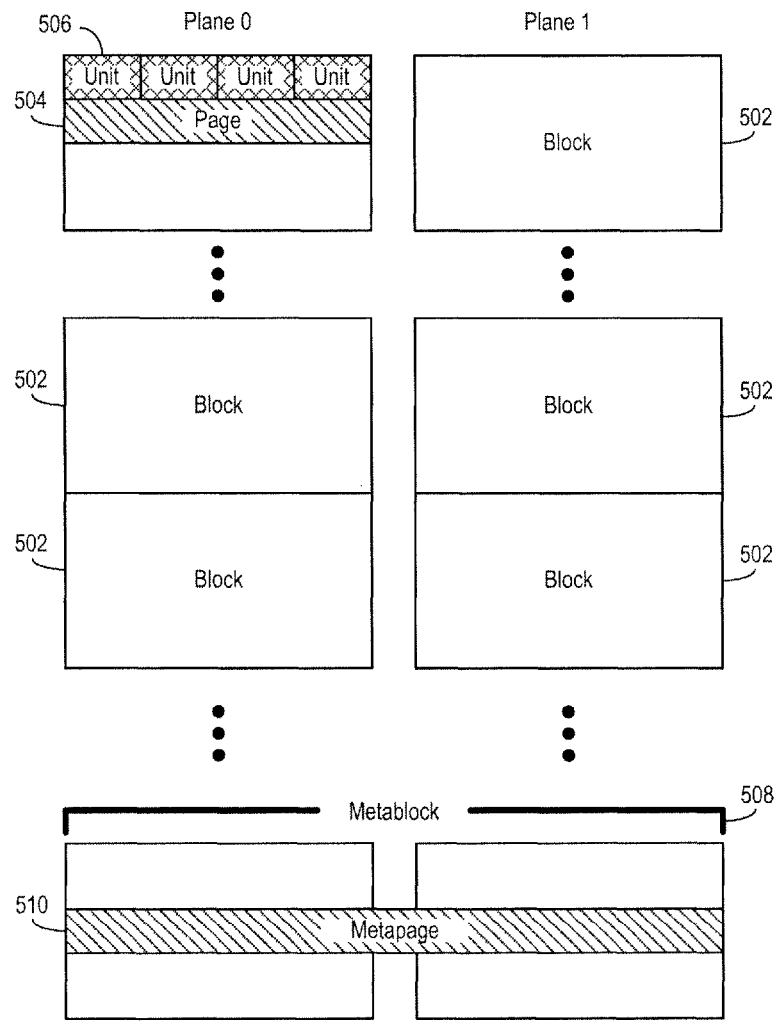
FIG. 5 is a block diagram of an example organizational arrangement or hierarchy of a memory array for flash memory.

Referring to FIG. 5, the memory array 142 and/or a plurality of memory arrays 142 spanning multiple memory dies 104 may have an organizational arrangement or hierarchy under which memory elements or cells of the memory array 142 and/or multiple memory arrays 142 of multiple memory dies 104 may be organized. The controller 102 may be configured to store and access data in accordance with the organizational arrangement or hierarchy.

FIG. 5 is a block diagram of an example organizational arrangement or hierarchy of a memory array 142 for flash memory. As mentioned, for flash memory, the memory cells may be divided or organized into blocks 502, and each block 502 may further be divided into a number of pages 504. Each block 502 may contain the minimum number of memory elements that may be erased together. In addition, each page 404 may be a unit of sensing in the memory array 142. Each individual page 504 may further be divided into segments or units 506, with each segment or unit 506 containing the fewest number of memory cells that may be written to at one time as a basic programming operation. Data stored in a segment or unit of memory cells—referred to as a flash memory unit (FMU), an ECC page, or a codeword—may contain the amount of data that is written at one time during a basic programming operation and/or the amount of data that can be encoded or decoded by the ECC engine 124 during a single encoding or decoding operation. The pages 504 may be divided into the same number of segments or units. Example numbers of segments or unit may be four or eight, although other numbers are possible. In general, data may be stored in blocks and pages of memory elements non-contiguously (randomly) or contiguously.

In addition, the organizational arrangement or hierarchy may include one or more planes in which each of the blocks 502 may be configured. Generally, a plane includes a "column" of blocks 502, although other configurations may be possible. A single memory array 142 may include a single plane or multiple planes. The example arrangement shown in FIG. 5 includes two planes, Plane 0 and Plane 1. Data stored in different planes may be sensed simultaneously or independently.

Additionally, the organizational arrangement or hierarchy may include metablocks 508 and metapages 510. A metablock address or number identifying a metablock may be mapped to and/or correspond to a logical address (e.g., a logical group number) provided by a host. A metablock 508 and a metapage 510 may span or be distributed across a respective single block and page in a single plane, or alternatively, may span or be distributed across respective multiple blocks and multiple pages across multiple planes. FIG. 5 shows the metablock 508 and the metapage 510 spanning across two planes, Plane 0 and Plane 1. Depending on the organizational arrangement, metablocks 508 and metapages 510 spanning across multiple planes may span across only those planes of a single memory die 104, or alternatively may span across multiple planes located of multiple memory dies 104.

A host and the non-volatile memory system 100 may use different addressing schemes for managing the storage of data. The host may utilize a host addressing scheme, also referred to as a logical addressing scheme. When a host wants to write data to the non-volatile memory system 100, the host may assign a host address or a logical address (also referred to as a logical block address (LBA)) to the data. Similarly, when the host wants to read data from the non-volatile memory system 100, the host may identify the data it wants read by the logical address. The host may utilize a logical addressing scheme in which a host file system maintains a logical address range for all LBAs assigned or recognized by the host. In addition, for some example configurations, the host may address data in units of logical sectors. Accordingly, host read and write requests may be requests to read and write a segment comprising a string of logical sectors of data with contiguous addresses.

In contrast to the host's logical addressing scheme, the non-volatile memory system 100 may store and access data according to a physical addressing scheme that uses physical addresses different from the logical addresses assigned by the host to store and access data.

Referring back to FIG. 2A, to coordinate the host's logical addressing scheme with the non-volatile memory system's physical addressing scheme, the command generator 164 may perform address translation in which the non-volatile memory system 100 translates a logical address included in a host request to a physical address for storage or retrieval of data. For some example implementations, when the non-volatile memory 100 performs an initial address translation, the physical address that the non-volatile memory system 100 determines may identify a metablock, a plurality of metablocks, and/or physical sectors within a metablock, at which the data is stored.

Figure 6:
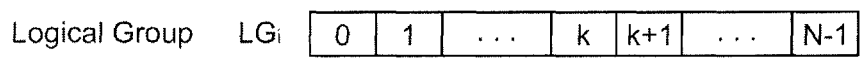
FIG. 6 is a schematic diagram of an example mapping between logical groups and metablocks.
Figure 6:
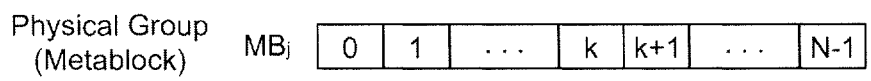
Figure 6:
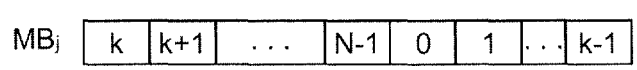

For some example configurations, the logical addresses (LBAs) may be grouped into logical groups (LGs), and the logical groups may be mapped to the metablocks. FIG. 6 shows a schematic diagram of the mapping between logical groups (LG) and metablocks (MB). Each logical group may be mapped to a unique metablock. Accordingly, as shown in FIG. 6, a metablock may have a N-number of physical sectors for storing N-logical sectors of data associated with a logical group. For some example configurations, the logical sectors of data may be stored in the physical sectors in contiguous and sequential logical order 0, 1, . . . N−1. Alternatively, N logical sectors of data may be stored randomly or discontiguously in N physical sectors of a metablock.

In addition, for some example configurations where data is stored contiguously, there may be an offset between the lowest address of a logical group and the lowest address of the metablock to which it is mapped. In that case, logical sector addresses may wrap around as a loop from the bottom back to the top of the logical group within the metablock. For example, as shown in the bottom diagram of FIG. 6, a metablock $MB_j$ may store data associated with a logical sector k in its first physical sector 0. When the last logical sector N−1 is reached, the logical sectors may wrap around such that the first logical sector 0 is stored contiguously and sequentially after logical sector 0, and the logical sector k−1 is stored in the last physical sector N−1. A page tag may be used to identify any offset, such as by identifying the starting logical sector address of the data stored in the first physical of the metablock.

In order to keep track of where in the non-volatile memory system 100 data is stored, the non-volatile memory system 100 may maintain or manage a directory system that maps relationships or associations between host or logical addresses and physical addresses (e.g., metablock addresses). The directory system may include one or more address data structures 172 (FIG. 2A) (such as tables, listings, logs, or databases as examples) that track and identify the logical-physical address relationships or mappings that the controller 102 may access to determine where in the non-volatile memory system 100 the most recent version of the data is stored.

Various configurations or implementations of the data structure(s) 172 to effectively manage the mappings between the logical and physical addresses may be possible. In some embodiments, the address data structures may include a primary address data structure (also referred to as a Group Address Table (GAT)) that provides a primary logical-physical address mapping for logical addresses included in the logical address range recognized by the host. Various configurations of the mapping for the GAT are possible. In one example configuration for flash technology, the GAT keeps track of logical-physical address mapping between logical groups of logical sectors and corresponding metablocks. The GAT includes an entry for each logical group, ordered sequentially according to logical addresses. In addition, the GAT may be organized into a plurality of GAT pages, with each GAT page including entries identifying a metablock address for every logical group. For some example configurations, the address data structures may include at least one secondary address data structure in addition to the GAT. The at least one secondary address data structure may provide logical-physical address mapping for data fragments, may track changes or updates to where data is stored, or some combination thereof. One example secondary address data structure, referred to as GAT Delta, may track changes to entries and/or include a listing of changed entries in the mappings of the GAT. When data is re-written, the new version of the data may be written to another part of the non-volatile memory system 100, such as in an update block. GAT Delta may map data stored in the update blocks with associated logical groups. For some example configurations, GAT Delta may be part of a Master Index Page (MIP) that, in addition to GAT Delta, includes a Free Block List (FBL) and/or the GAT. The Free Block List may be a list that identifies blocks that are available for storage of data (e.g., for allocation as an update block) and that may be later mapped to logical groups. Other secondary address data structures may be possible.

Such primary and secondary address data structures are merely exemplary and other data structures may be possible. In general, the non-volatile memory system 100 may maintain at least one address data structure 172 that associates host logical address information with physical address information.

When a host system sends a host read request to the non-volatile memory system 100, the front end module 108 may receive the read request and place the read request in the read request queue 168. The read request queue 168 may have a maximum size or capacity that allows for up to a predetermined maximum number of host read requests to be pending in the queue 168 at the same time. The command generator 164 may select the host read request from the read request queue 168 and generate one or more read context commands to have the requested data transferred from the non-volatile memory die(s) 104 to the RAM 116. When the data is loaded into the RAM 116, the front end module 108 may then send the data back to the host system to complete execution of the host read request.

In general, it is desirable for the non-volatile memory system 100 to respond to the host read request and provide the data being requested to the host system as quickly as possible. Under some configurations and/or in accordance with some protocols, such as Serial Advanced Technology Attachment (SATA), the front end module 108 may transfer data units making up the requested data back to the host system in a particular sequential order. The order may be indicated by the host read request, such as by the logical addresses indicated in the host read request. As indicated by the order, the requested data may include an initial data unit that is to be transferred back to the host system first, before the other data units that are being requested by the host read request. The front end module 108 may not begin transferring the data back to the host system until the initial data unit is loaded into the RAM 116. That is, if data units other than the initial data unit are loaded into the RAM 116 and ready to be sent to the host before the initial data unit is, those other data units may not be sent back to the host system until the initial data unit is loaded into the RAM 116 and sent to the host system. On the other hand, if the initial data unit is loaded in the RAM 116 and ready to be sent, then the front end module 108 may begin sending the initial data unit along with other data units that have been loaded in the RAM 116, even if all of the requested data units are not loaded in the RAM 116. Thus, loading the initial data unit into the RAM 116 as fast as possible for optimal response time in responding to back to the host system may be desirable.

The scheduler 166 may be configured to generate a schedule that indicates when read context commands associated with a host read request are to be selected and sent to the memory dies 104 to have the requested data units loaded into the RAM 116. The schedule may be generated with the aim of optimizing the non-volatile memory system's overall performance in handling host read requests. To do so, the scheduler 166 may generate a schedule according to a plurality of different scheduling schemes, each with an associated priority. One scheduling scheme may prioritize having the initial data unit associated with a load read request loaded into the RAM 116 is fast as possible (i.e., minimizing the response time in having the initial data unit loaded into the RAM 116). Another scheduling scheme may prioritize maximizing channel throughput in order to have as many data units as possible loaded into the RAM 116 as fast as possible. Optimizing for channel throughput may be performed by simultaneously utilizing as many of the channels 106 in parallel as possible. This may be done without regard for an order in which the host system is expecting the data units to be returned.

For a given host read request, scheduling the transfer of the data units so that the initial data unit is loaded into the RAM 116 as fast as possible (i.e., before the other data units), and scheduling the transfer of the data units to optimize for channel throughput may be competing priorities, depending on which memory dies 104 are storing the data units, which channels are to be used to retrieve those data units, and the busy/idle status of those channels. To illustrate, suppose a host system has requested three data units to be read, with the host system expecting to receive the first data unit first, the second data unit second, and the third data unit third. If, for example, the channels to be used to transfer the second and third data units to the RAM 116 are available, but the channel to be used to transfer the first data unit is not yet available (i.e., it is busy) then in order to optimize for channel throughput, the sequencer 126 may begin utilizing the available channels to transfer the second and third data units into the RAM 116 without waiting for the channel used to transfer the first unit to become available. As a result, the first (i.e., initial) data unit will not be the first data unit of the three to be loaded into the RAM 116. Alternatively, if the sequencer 126 selects the read context commands so that the first data unit is loaded into the RAM 116 before the second and third data units, then the sequencer 126 may wait to have the second and third data units transferred until the channel to be used to transfer the first data unit becomes available. In doing so, the channels used to transfer the second and third data units will be idle for a certain period of time even though there are pending commands and data scheduled to be transferred on those channels. As such, channel throughput under the latter scheduling that prioritized loading the initial data unit into the RAM 116 first is not optimized.

As mentioned, the read request queue 168 may be configured to store or queue up to a maximum number of host read requests at the same time, and how many host read requests that the read request queue 168 is queuing at a given point in time may be or indicate its queue depth. The queue depth of the read request queue 168 may be correspond to which scheduling scheme provides the best overall performance for responding to a host read request. When the queue depth is relative low, a schedule scheme that prioritizes minimizing the response time in loading the initial data unit into the RAM 116 over maximizing channel throughput may provide an overall better performance for responding to the host read request. However, when the queue depth is relatively high, then any benefits of prioritizing the response time in loading the initial data unit into the RAM 116 over channel throughput may not be realized. As such, when the queue depth relatively high, a schedule that prioritizes channel throughput over the response time in loading the initial data unit into the RAM 116 may provide a better overall performance for responding to the host read request.

The scheduler 166 may be configured to adapt its scheduling and determine which scheduling scheme to use to generate a schedule based on the queue depth of the read request queue i.e., whether the queue depth is high or low. To do so, a queue depth threshold for the read request queue 168 may be set that identifies whether the scheduler 166 should generate a schedule for a host read request according to a first scheduling scheme one that prioritizes minimizing the response time in loading the initial data unit into the RAM 116 over maximizing channel throughput—or a second scheduling scheme—one that prioritizes maximizing channel throughput over minimizing the response time in loading the initial data unit into the RAM 116. If the scheduler 166 identifies that the queue depth of the read request queue 168 is below the threshold, then the scheduler 166 may determine that the queue depth is low and generate a schedule according to the first scheduling scheme. Alternatively, if the scheduler 166 identifies that the queue depth of the read request queue 168 is above the threshold, then the scheduler 166 may determine that the queue depth is high and generate a schedule according to the second scheduling scheme. By utilizing the queue depth of the read request queue 168, the scheduler 166 may generate schedules for host read requests that in an adaptive or dynamic way that optimizes the non-volatile memory system's overall performance in handing and responding to host read requests.

Figure 7:
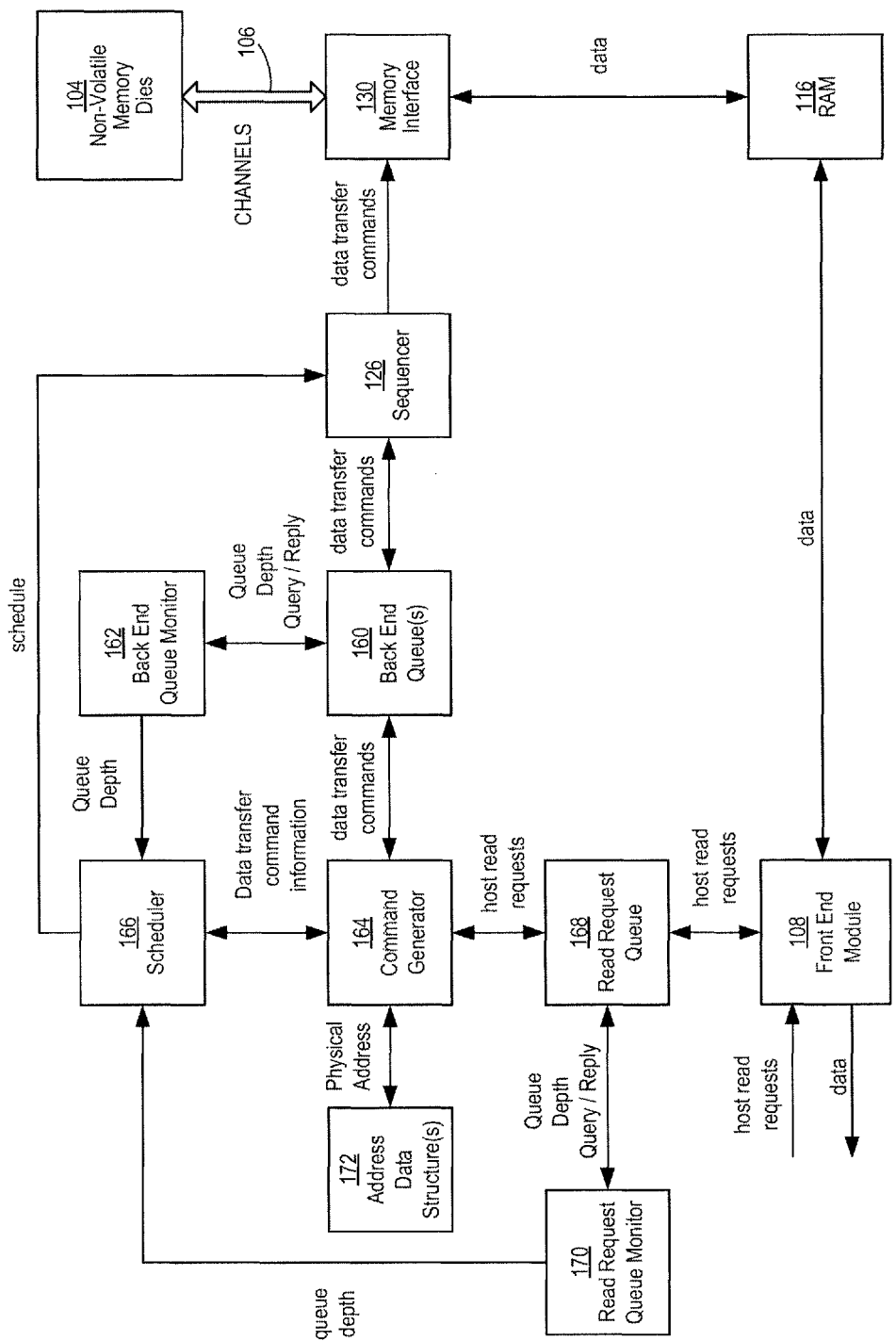
FIG. 7 is a block diagram of components of the non-volatile memory system of FIGS. 1A-1C and 2A, 2B that may be involved in execution of a host read request.

FIG. 7 shows a block diagram of the components of the non-volatile memory system 100 from FIG. 2A that may be involved in execution of a host read request. As mentioned, the host read request may be a request from a host system to read data stored in the non-volatile memory dies 104. The data may include a plurality of data units. The host read request may include host logical addresses that identify where, according to the host, the data units are stored. The host read request, such as the host logical addresses in the host read request, may indicate an order or sequence in which the host system expects the data units to be returned to it, which may include an initial data unit that is to be returned first (i.e., before the other data units) to the host system.

The front end module 108 may receive the host read request from the host system, and place the host read request in the read request queue 168. In some example configurations, the front end module 108 may be configured to first identify that the host request is a read request, as opposed to a different type of host request (e.g., a program, abort, or status request, as examples) before placing the host read request in the read request queue 168. As mentioned, the read request queue 168 may have a size or maximum capacity, and according to the size, the read request queue 168 may be configured to store up to a maximum number of host read requests. In some example configurations, the maximum number of thirty-two, although other numbers are possible. As such, when the front end module 108 places the host read request in the read request queue 168, the host read request may be the only host read request in the queue 168, or may be pending along with one or more other host read requests.

After the front end module 108 places the host read request in the read request queue 68, the command generator 164 may select or retrieve the host read request from the queue 168 and generate one or more read context commands to have the data units associated with the host read request transferred from the non-volatile memory dies 104 to the RAM 116. In some example configurations, the number of read context commands generated may correspond to the number of data units that the host read request is requesting to be read. Accordingly, the command generator 164 may be configured to parse through the host read request to determine the number of read context commands to be generated to retrieve the requested data. For example, the command generator 164 may determine the size of the data being requested, which in turn may indicate the number of read context commands to be generated.

Additionally, in some example configurations, a read context command to transfer a data unit from the non-volatile memory dies 104 to the RAM 116 may actually include a pair of context commands, including a sense command and a data transfer command. The sense command may be issued to the non-volatile memory dies 104 to have a data unit associated with the read context command sensed from the memory array 142 into the data cache 144 (FIG. 2B). The data transfer command of the pair may then be issued to have the data unit in the data cache 144 transferred to the RAM 116. In other example configurations, a read context command may include just a single command. Various read context command configurations to have a data unit transferred from the non-volatile memory dies 104 to the RAM 116 may be possible.

In addition to determining the number of read context commands (or context command pairs) to be generated, the command generator 164 may also perform address translation to determine the physical addresses identifying where in the non-volatile memory dies 104 the data units are being stored. To do so, the command generator 164 may query the address data structure(s) 172 with the host logical address information identified in the host read request. Based on the query, the command generator 164 may determine physical address information identifying where the data units are being stored. In some example configurations, the query may return metablock address information, and a second address translation may be performed to translate the metablock addresses into actual physical addresses that includes the physical attributes of the memory dies 104 identifying where the data units are stored. Example physical attributes may include the bank, the die, the block, the wordline, and the bitline (or bitline offset) of where a data unit is being stored. Using actual physical address identifying where a data unit is located, which of the channels 106 to use to retrieve the data unit may be determined.

The read context commands that are generated may each be associated with and/or be used to retrieve a different one of the data units being requested to be read by the host read request. The read context commands may each include a first identifier that identifies which host read request the read context commands are associated with, as there may be multiple host read requests pending and/or in the process of being executed in the non-volatile memory system 100. Addition, the read context commands may each include a second identifier that uniquely identifies the read context command among the plurality of read context commands associated with a single host read request. One of the second identifiers may identify the read context command that is associated with the initial data unit and used to transfer the initial data unit from the non-volatile memory dies 104 to the RAM 116. This read context command may be referred to as the initial read context command.

After the read context commands are generated, the command generator 164 may place the read context commands in the back end queue(s) 160. In one example configuration, the back end queue(s) may include a plurality of queues, each being associated with one of the channels 106 and/or banks 302 (FIG. 3). For example, if the non-volatile memory system 100 includes four channels 106, then the back end queue(s) 160 may include four queues, each associated with one of the four channels. A context command to be issued on a particular channel may be placed in the associated back end queue 160 by the command generator. Using the actual physical address information, the command generator may be configured to determine on which channels each of the read context commands are to be issued and then place each of the read context commands in the appropriate back end queues 160 accordingly. In some example configurations, the read context commands may be queued in the back end queues 160 along with context commands associated with other host commands, including other host read requests or program requests as examples.

The sequencer 126 may be configured to select the read context commands from the back end queues 160 and issue the read context commands on their respective channels 106 via the memory interface 130. For example, if a context command is placed in a first back end queue associated with a first channel, then when the sequencer 126 selects that context command from the first back end queue, the sequencer 126 may issue that context command on the first channel via the memory interface 130.

In addition, the back end queues 160 may be configured as first-in first-out (FIFO) queues. A context command at the head of a back end queue 160 may be the next context command in that queue 160 to be selected by the sequencer 126. After the sequencer 126 selects a context command at the head of a queue 160, then remaining context commands in that queue 160 may be moved up such that a next context command to be selected is located at the head of the queue 160.

When the sequencer 126 selects a data transfer command from a back end queue 160 and issues the data transfer command on a channel, the channel may become busy. The channel on which the data transfer command is issued may also be the channel used to transfer the associated data unit, and the channel may stay busy until the associated data unit is finished being transferred across the channel. After the channel is no longer busy, the channel may be idle or available for another context command, such as another data transfer command to be issued. As such, when a channel is idle or available, the sequencer 126 may be able to select a context command from the head of an associated back end queue 160 and issue the context command on that channel. Conversely, when a channel is busy, the sequencer 126 may not be able to select a context command from the head of an associated back end queue 160 and issue the context command on that channel.

The scheduler 166 may be configured to generate a schedule for the sequencer 126 that indicates to and/or instructs the sequencer 126 when to select data transfer commands located at the heads of the back end queues 160. The scheduler 166 may generate the schedule based on three sets of information: queue depth information of the read request queue 168, data transfer command information, and queue depth information of the back end queues 160.

The scheduler 166 may receive the queue depth information of the read request queue 168 from the read request queue monitor 170. The read request queue depth monitor 170 may query the read request queue 168 to determine its queue depth, and then pass the queue depth status information to the scheduler 166. Similarly, the scheduler 166 may receive the queue depth information of the back end queues 170 from the back end queue monitor 162. The back end queue monitor 162 may query the back end queues 160 to determine its queue depth, and then pass the queue depth status information to the scheduler 166. Additionally, the scheduler 166 may receive data transfer command information from the command generator 164. From the data transfer command information, the scheduler 166 may identify the data transfer commands associated with the host read request, determine the number of the data transfer commands, and/or which back end queue 160 each of the data transfer commands is located (i.e., which channel each of the data transfer commands are to be issued on).

The scheduler 166 may generate a schedule for selection of the data transfer units requesting to be read by the host read request according to the first selection scheme or the second selection scheme. As previously described, the first scheduling scheme prioritizes minimizing the response time in loading the initial data unit into the RAM 116 over maximizing channel throughput and the second scheduling scheme prioritizes maximizing channel throughput over minimizing the response time in loading the initial data unit into the RAM 116.

The scheduler 166 may determine whether to generate the schedule according to the first scheduling scheme or the second scheduling scheme based on the queue depth information of the read request queue 168. If the queue depth information indicates that the current queue depth of the read request queue 168 is below a queue depth threshold for the read request queue 168, then the scheduler 166 may generate the schedule according to the first scheduling scheme. Alternatively, if the queue depth information indicates that the current queue depth of the read request queue 168 is above the queue depth threshold, then the scheduler 166 may generate the schedule according to the second scheduling scheme.

A schedule generated according to the second scheduling scheme may indicate to the sequencer 126 to select a data transfer command at the head of a back end queue 160 if the associated channel is available. Doing so may maximize channel throughput and minimize the time that the channels are idle. Alternatively, a schedule generated according to the first scheduling scheme may indicate to the sequencer 126 to refrain from or delay selecting a data transfer command at the head of a back end queue 160 even if the associated channel is not busy until the initial data transfer command has been selected. Doing so may ensure that the initial data unit is loaded into the RAM 116 first, in accordance with the first scheduling scheme.

Figure 8A:
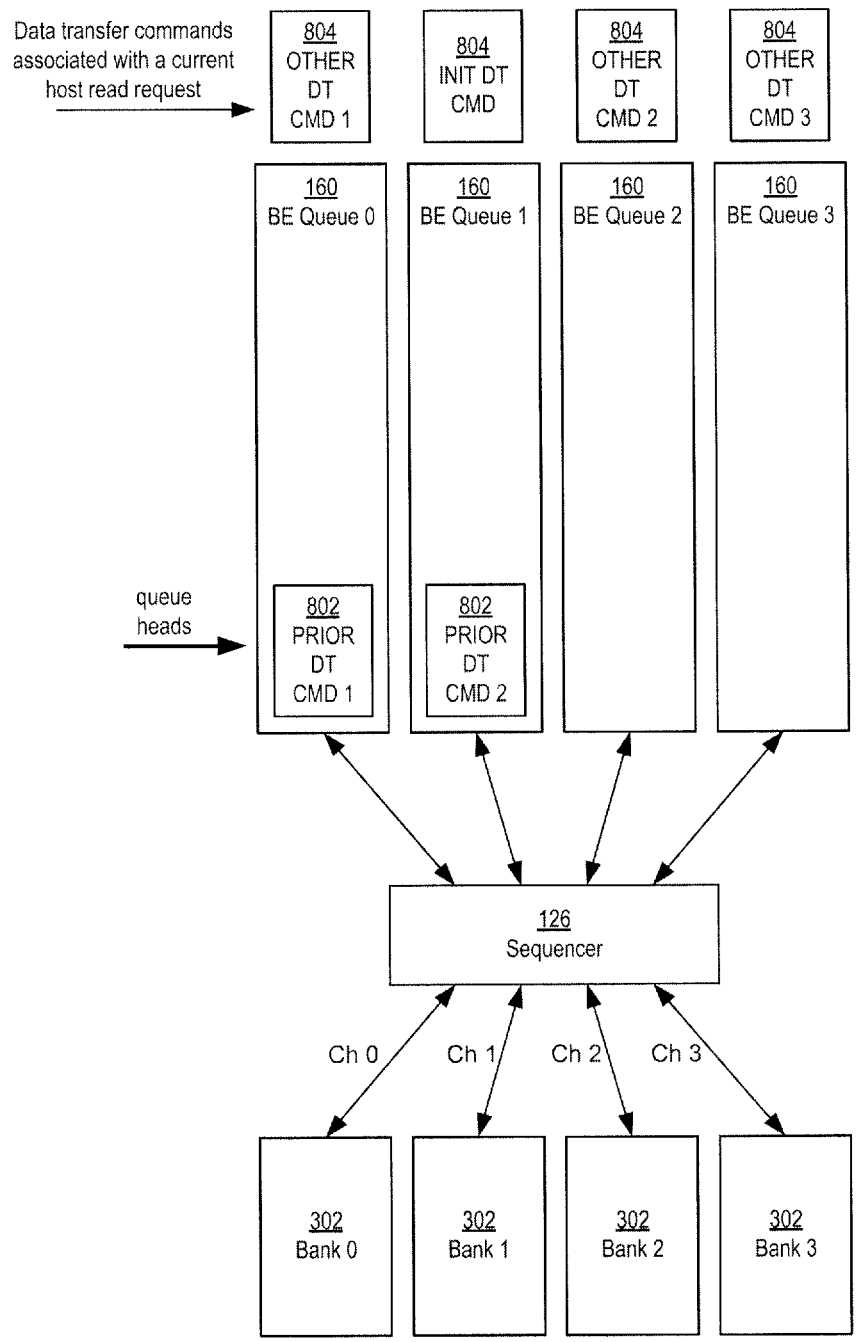
FIG. 8A is a schematic diagram showing an example situation in which a schedule may be generated for a plurality of data transfer commands to be queued in a plurality of back end queues.
Figure 8B:
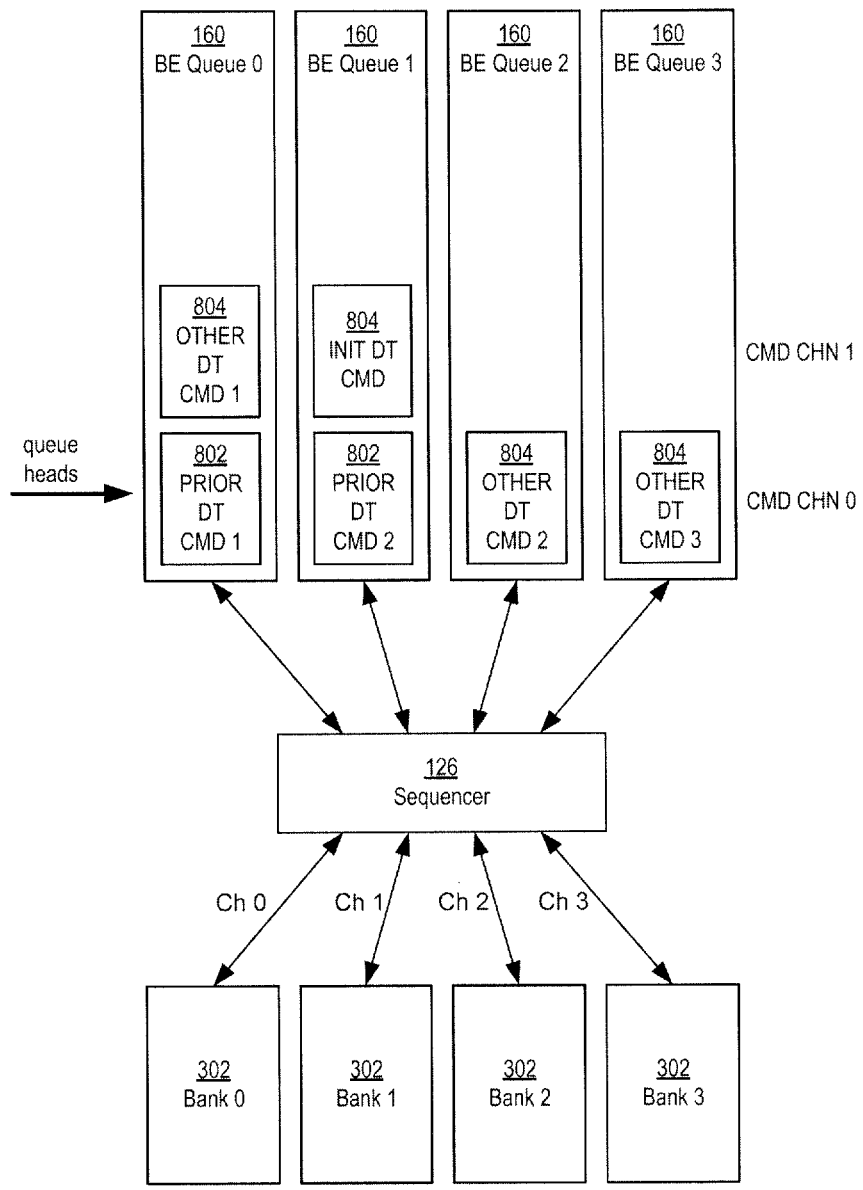
FIG. 8B is a schematic diagram showing the schedule for the example situation in FIG. 8A being generated according to a scheduling scheme that prioritizes channel throughput.
Figure 8C:
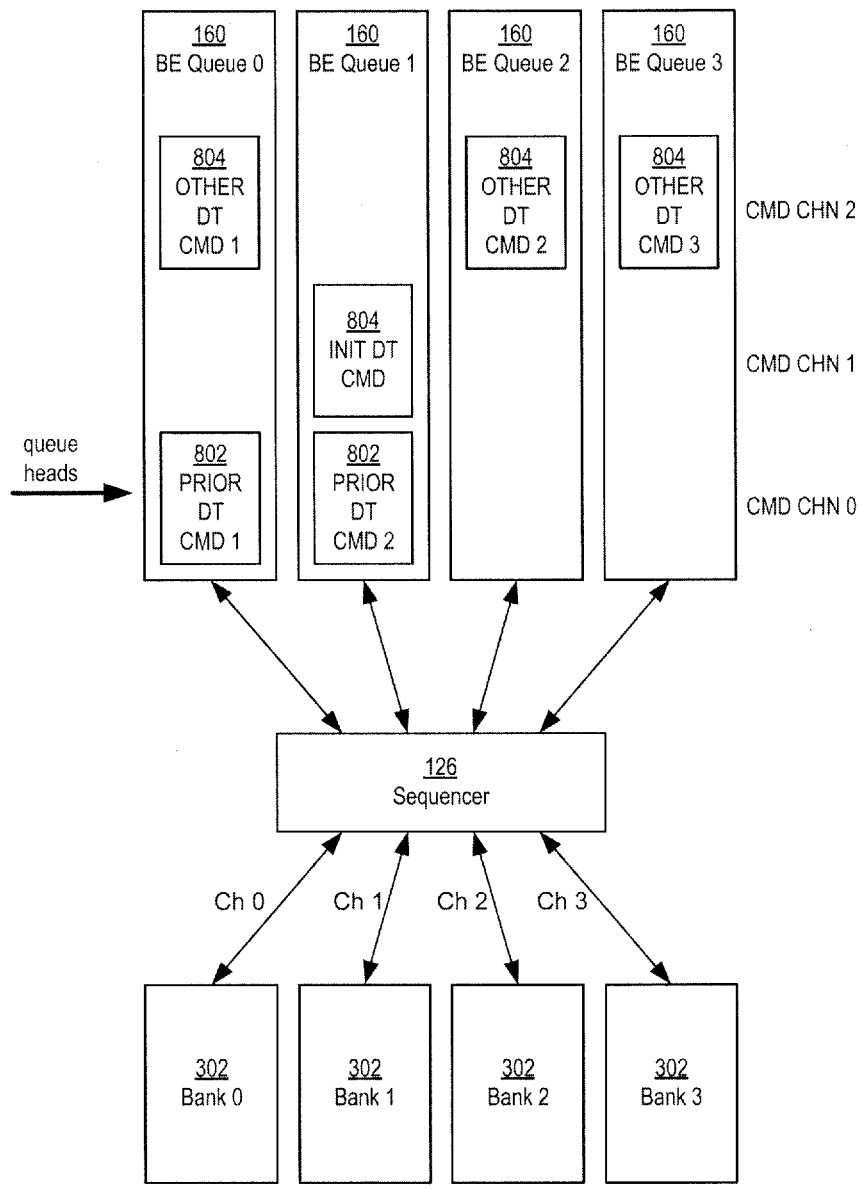
FIG. 8C is a schematic diagram showing the schedule for the example situation in FIG. 8A being generated according to a scheduling scheme that prioritizes response time in transferring an initial data unit into a temporary storage area.

FIGS. 8A, 8B, and 8C show an example of how a schedule may be generated differently according to the first scheduling scheme and the second scheduling scheme to indicate or instruct the sequencer 126 to select data transfer commands. Referring to FIG. 8A, in the example, the non-volatile memory dies 104 may be configured into four banks 302, including a first bank Bank 0, a second bank Bank 1, a third bank Bank 2, and a fourth bank Bank 3. Accordingly, four channels may be used by the sequencer 126 to communicate with the four banks, including a first channel Ch. 0, a second channel Ch. 1, a third channel Ch. 2, and a fourth channel Ch. 3. Additionally, the back end queue(s) 160 may include four back end queues, including a first back end queue BE Queue 0, a second back end queue BE Queue 1, a third back end queue BE Queue 2, and a fourth back end queue BE Queue 3.

In the example shown in FIG. 8A, suppose that when the scheduler 166 determines to generate a schedule for a host read request, the current queue depth status information of the back end queues 160 indicates that there are two data transfer commands 802 associated with a prior or different host read request pending in the back end queues 160, including a first prior data transfer command PRIOR DT CMD 1 queued in the first back end queue BE Queue 0, and a second prior data transfer command PRIOR DT CMD 2 queued in the second back end queue BE Queue 1. Also, as shown in FIG. 8A, each of the first and second prior data transfer commands PRIOR DT CMD 1 and PRIOR DT CMD 2 are located at the heads of their respective back end queues. Also, the current queue depth status information indicates that the third and fourth back end queues BE Queue 2 and BE Queue 3 are both empty.

Further, suppose in the example that data transfer command information that the scheduler 166 receives from the command generator 160 indicates that four data transfer commands 804 are generated to load four data units into the RAM 116, including an initial data transfer command INIT DT CMD, and three other data transfer commands, including a first other data transfer command OTHER DT CMD 1, a second other data transfer command OTHER DT CMD 2, and a third other data transfer command OTHER DT CMD 3. Suppose further that the data transfer command information indicates that the initial data transfer command INIT DT CMD is queued in the second back end queue BE Queue 1 to be issued on the second channel Ch. 1, the first other data transfer command OTHER DT CMD 1 is queued in the first back end queue BE Queue 0 to be issued on the first channel Ch. 0, the second other data transfer command OTHER DT CMD 2 is queued in the third back end queue BE Queue 2 to be issued on the third channel Ch. 2, and the third other data transfer command OTHER DT CMD 3 is queued in the fourth back end queue BE Queue 3 to be issued on the fourth channel Ch. 3.

Referring to FIG. 8B, suppose that the scheduler 166 determines that the current queue depth of the read request queue 160 is above the queue depth threshold (i.e., that the queue depth is high). In response to the determination, the scheduler 166 may determine to generate the schedule according to the second scheduling scheme, which prioritizes maximizing channel throughput over minimizing response time in having the initial data unit loaded in the RAM 116.

Under the second scheduling scheme, the schedule may indicate to the sequencer 126 to select a data transfer command if its associated channel is available. In the example, the first and second back end queues BE Queue 0 and BE Queue 1 each have one data transfer commands already queued whereas the third and fourth back end queues BE Queue 2 and BE Queue 3 are empty. As such, the second and third other data transfer commands OTHER DT CMD 2 and OTHER DT CMD 3 may be selected by the sequencer 126 right away, whereas the initial data transfer command INIT DT CMD and the first other data transfer command OTHER DT CMD 1 have to wait to be selected until the first and second prior data transfer commands PRIOR DT CMD 1 and PRIOR DT CMD 2 are selected and removed from the back end queues BE Queue 0 and BE Queue 1.

In general, data transfer commands located in the same position in their respective back end queues 160 may be part of the same command chain. Commands located in the same command chain may be selected by the sequencer 126 and sent on their respective channels at the about the same time. In FIG. 8B, because the third and fourth back end queues BE Queue 2 and BE Queue 3 are empty and the scheduler 166 is employing the second scheduling scheme, then the schedule generated by the scheduler 166 may indicate to include the second and third other data transfer commands OTHER DT CMD 2 and OTHER DT CMD 3 with the first and second prior data transfer commands PRIOR DT CMD 1 and PRIOR DT CMD 2 in a first command chain CMD CHN 0. Accordingly, sequencer 126 may select the second and third other data transfer commands OTHER DT CMD 2 and OTHER DT CMD 3 at about the same time as it selects the first and second prior data transfer commands PRIOR DT CMD 1 and PRIOR DT CMD 2. Also, as shown in FIG. 8B, the initial data transfer command INIT DT CMD and the first other data transfer command OTHER DT CMD 1 may be part of a second command chain CMD CHN 1. These data transfer commands in the second command chain CMD CHN 1 may be selected after the data commands in the first command chain CMD CHN 1 are selected.

In addition, a command chain time period $T_{Chain}$ may be a time period that elapses to select a data transfer command from the head of a back end queue 160, issue the command on a channel, and have the associated data unit transferred from a memory die 104 to the RAM 116. This command chain time period $T_{Chain}$ is about the same among the data transfer commands and associated data units. Accordingly, the scheduler 166 may expect that one command chain time period $T_{Chain}$ may elapse before the channels are available for the data transfer commands in the second command chain CMD CHN 1 to be selected and issued on the first and second channels Ch. 0 and Ch. 1. Also, since the command chain time period $T_{Chain}$ is generally about the same for each data transfer command, then the scheduler 166 can expect that the second and third other data units associated with the second and third other data transfer commands OTHER DT CMD 2 and OTHER DT CMD 3 will be loaded into the RAM 116 before the data units associated with the initial data transfer command INIT DT CMD and the first other data transfer command OTHER DT CMD 1 are loaded into the RAM 116. However, because the second scheduling scheme prioritizes maximizing channel throughput rather than minimizing the response time in which the initial data unit is loaded into the RAM 116, then such an outcome where an other data unit is loaded into the RAM 116 before the initial data unit is loaded into the RAM is acceptable under the second scheduling scheme as long as doing so aims to maximize channel throughput.

Referring to FIG. 8C, suppose that the scheduler 166 determines that the current queue depth of the read request queue 160 is below the queue depth threshold (i.e., that the queue depth is low). In response to the determination, the scheduler 166 may determine to generate the schedule according to the first scheduling scheme, which prioritizes minimizing the response time in having the initial data unit loaded into the RAM 116 over maximizing channel throughput. According to the first scheduling scheme, the scheduler 166 may generate the schedule to have the initial data unit loaded into the RAM 116 before the other data units associated with the host read request are loaded into the RAM 116. The schedule may have the initial data unit loaded into the RAM 116 before the other data units associated with the host read request regardless of the availability of the channels 106. In other words, when the scheduler 166 determines the schedule according to the first scheduling scheme, the scheduler 166 may set the schedule so that the initial data unit is loaded into the RAM 116 first, even if availability information for the channels 106 indicates that other data units associated with the read request can be loaded into the RAM 116 before the initial data unit. This may include setting the schedule so that the initial data transfer command is issued before data transfer commands associated with other data units are transferred.

With regard to the example of FIGS. 8A-8C, as before, the scheduler 166 may determine that the second prior data transfer command PRIOR DT CMD 2 is loaded in the second back end queue BE 1 and is part of the first command chain CMD CHN 0. Accordingly, the scheduler 166 may determine that the earliest the sequencer 126 can select the initial data transfer command INIT DT CMD is by including it in the second command chain CMD CHN 1.

The scheduler 166 may further determine that in order for the initial data unit to be loaded into the RAM 116 before the other data units, the first, second, and third other data transfer commands OTHER DT CMD 1, OTHER DT CMD 2, and OTHER DT CMD 3 may be included in a second command chain CMD CHN 2. By being in the second command chain CMD CHN 2, the first, second, and third other data transfer commands OTHER DT CMD 1, OTHER DT CMD 2, and OTHER DT CMD 3 may be selected by the sequencer 126 after the initial data transfer command INIT DT CMD in the second command chain CMD CHN 1 is selected. Identifying the first, second, and third other data transfer commands OTHER DT CMD 1, OTHER DT CMD 2 in the second command chain CMD CHN 2 in the schedule may indicate to the sequencer 126 to wait one command chain time period $T_{Chain}$ after selecting the initial data transfer command INIT DT CMD before selecting the first, second, and third other data transfer commands OTHER DT CMD 1, OTHER DT CMD 2, and OTHER DT CMD 3. That is, the schedule may indicate to the sequencer 126 to delay its selection of the first, second, and third other data transfer commands OTHER DT CMD 1, OTHER DT CMD by one command chain time period $T_{Chain}$. The sequencer 126 may wait the one command chain time period $T_{Chain}$ or delay its selection of the other data transfer command by the one command chain time period $T_{Chain}$ even though the first, third, and fourth channels Ch. 0, Ch. 2, and Ch. 3 may be available when the sequencer 126 is to select the initial data transfer command INIT DT CMD. By waiting or delaying the selecting by the one command chain time period $T_{Chain}$, the initial data unit may be loaded into the RAM 116 before the first, second, and third other data units are loaded into the RAM 116 in accordance with the first scheduling scheme.

Referring back to FIG. 7, upon review of the data transfer command information, the queue depth status information of the back end queues 160, and whether the scheduler is to use the first scheduling scheme or the second scheduling scheme, the scheduler 166 may generate the schedule by assigning a command chain to each of the data transfer commands. When the schedule is generated, the scheduler 166 may send the schedule to the sequencer 126. The sequencer 126 may then use the schedule to determine whether or not to select a data transfer command.

When the sequencer 126 selects a data transfer command from a back end queue 160, the sequencer 126 may send the data transfer command on the associated channel, which may be received by a memory die in coupled to that channel. The memory die 104 may transfer the data unit associated with the data transfer command on the channel to the memory interface 130, which may then transfer the associated data unit to the RAM 116. Other configurations in which the memory interface 130 is to used in the transfer of the memory units from the dies 104 to the RAM 116 may be possible. Although not shown in FIG. 7, processing of the data after it is loaded into the RAM, such as error correction by the ECC engine 124, may be performed on the data before it is ready to be sent to the host system.

After the initial data unit is loaded into the RAM 116 and ready to be transferred to the host system, the front end module 108 may begin the transfer of the initial data unit, along with other data units associated with the host read request that may be loaded in the RAM 116, back to the host system. In some example configurations, the front end module 108 may begin transferring the initial data unit to the host system before all of the other data units are loaded into the RAM 116. If the data is loaded in the RAM 116 using a schedule generated according to the first scheduling scheme, and doing so causes the initial data unit to be loaded into the RAM 116 faster than if it was loaded into the RAM 116 based on a schedule generated according to the second scheduling scheme, then it may appear to the host system that the non-volatile memory system 100 is responding to the host read request faster even though the non-volatile memory system 100 is not optimizing for channel throughput on the back end when retrieving the data.

Figure 9:
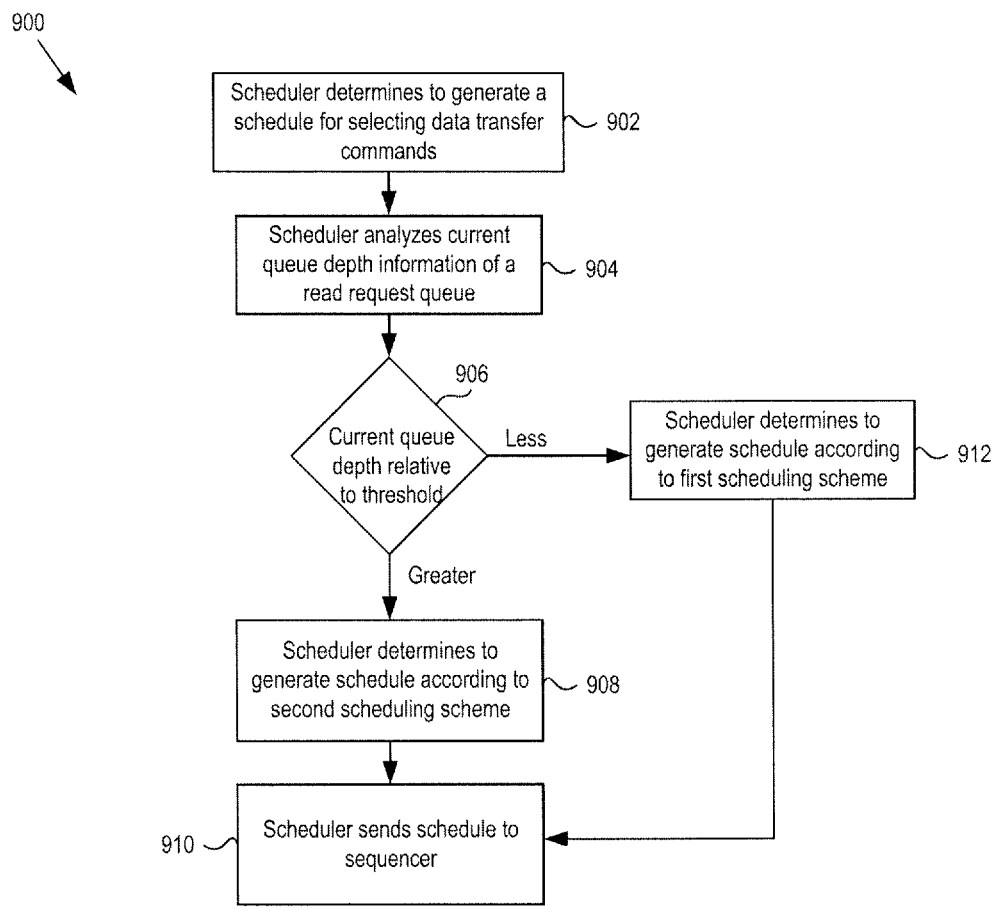
FIG. 9 is a flow chart of an example method of generating a schedule for selecting a plurality of data transfer commands associated with a host read request in a non-volatile memory system.

FIG. 9 is a flow chart of an example method 900 of generating a schedule for selecting a plurality of data transfer commands associated with a host read request in a non-volatile memory system. The host read request may request that the non-volatile memory system return a particular set of data that including a plurality of data units. At block 902, a scheduler may determine to generate a schedule for selecting the data transfer commands queued in a back end queue system. At block 904, in response to the determination, the scheduler may analyze current queue depth information of a read request queue, which may be received from a read request queue monitor.

At block 906, the scheduler may determine if the current queue depth information is greater than or less than a queue depth threshold associated with the read request queue. If it is, then at block 908, the scheduler may determine to generate the schedule according to a second scheduling scheme that prioritizes maximizing channel throughput over minimizing response time in transferring an initial data unit of the plurality of data units. In some example methods, generating the schedule may include determining or assigning a command chain for each of the data transfer commands. The command chain to which a data transfer command is assigned may depend on the queue depth status of back end queues received from a back end queue monitor; which back end queue the data transfer command is queued, as determined from data transfer command information received from a command generator; and criteria for maximizing channel throughput, which may include minimizing the idle time for channels regardless of the order in which the data units are to be sent back to the host. Under these criteria, data units other than the initial data unit could be loaded into the RAM before the initial data unit if doing so aim to maximize channel throughput. After the schedule is generated at block 908, then at block 910, the scheduler may send the schedule to the sequencer, which may use or refer to the schedule when determining whether to select data transfer commands in the queue.

Returning back to block 906, alternatively, if the current queue depth information is less than the queue depth threshold, then at block 912, the scheduler may determine to generate the schedule according to a first scheduling scheme that prioritizes minimizing response time in loading the initial data unit into the RAM. Similar to generating the schedule at block 908, in block 912, generating the schedule may include determining or assigning a command chain for each of the data transfer commands. At block 912, the command chain to which a data transfer command is assigned may depend on the queue depth status of the back end queues; which back end queue the data transfer command is queued; and criteria for minimizing the response time that the initial data unit is transferred from the non-volatile memory dies into the RAM, which may include scheduling an initial data transfer command to be selected before any of the other data transfer commands are selected. Under these criteria, the other data transfer commands may be assigned to one or more command chains after the command chain that is assigned to the initial data transfer command. As an example, referring to FIG. 8C, the other data transfer commands are assigned to the third command chain, i.e., one command chain after the second command chain that the initial data transfer command is assigned. Of course, more data transfer commands may yield a schedule in which data transfer commands are assigned to command chains more than one command chain after the command chain to which the initial data transfer command is assigned. After the schedule is generated according to the first scheduling scheme at block 912, the method may then proceed to block 910, where the scheduler may send the schedule to the sequencer.

Figure 10:
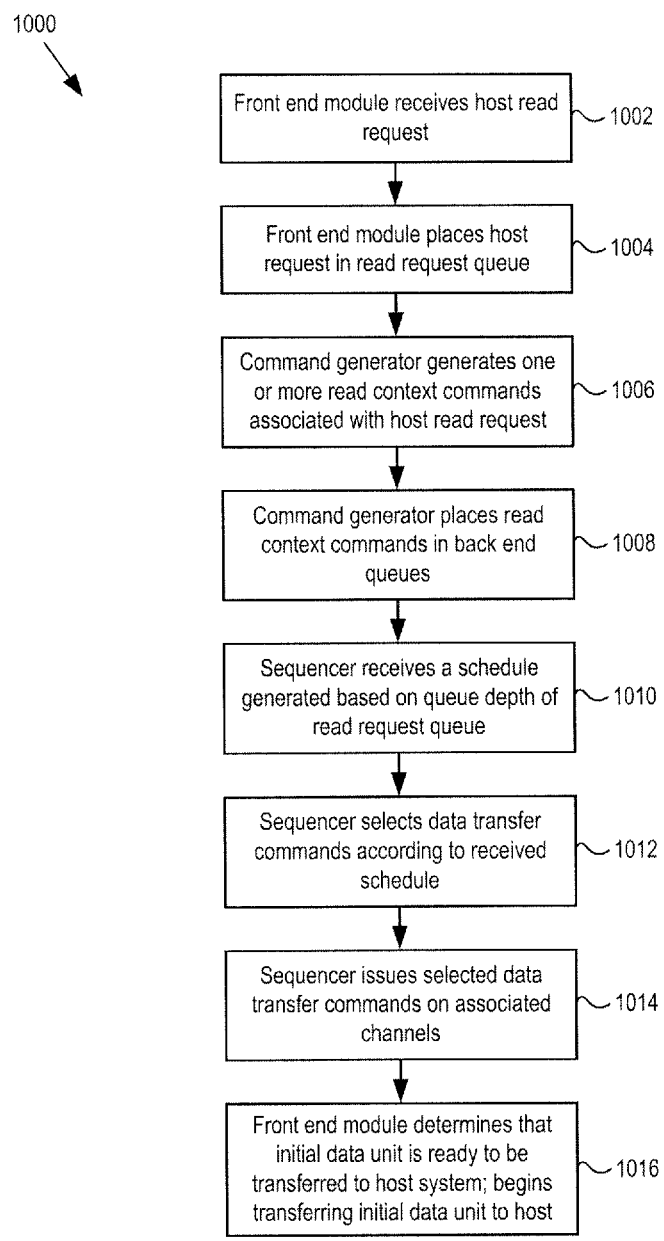
FIG. 10 is flow chart of an example method of executing a host read request.

FIG. 10 is flow chart of an example method 1000 of executing a host read request. At block 1002, at front end module of a non-volatile memory system may receive the host read request. The host read request may be a request from a host system to read data stored in non-volatile memory dies of the non-volatile memory system. The data may include a plurality of data units. The host read request may include host logical addresses that identify where, according to the host, the data units are stored. The host read request, such as the host logical addresses in the host read request, may indicate an order or sequence in which the host system expects the data units to be returned to it, which may include an initial data unit that is to be returned first (i.e., before the other data units) to the host system. At block 1004, the front end module may place the host read request in a read request queue.

At block 1006, a command generator may select or retrieve the host read request from the read request queue and generate one or more read context commands to have the data units associated with the host read request transferred from the non-volatile memory dies to a temporary storage area, such as a RAM, before the data units are then sent back to the host system to complete execution of the host read request. In some example methods, in order to generate the context commands, the command generator may parse through the host read request to determine the number of read context commands to be generated to retrieve the requested data, and also perform one or more address translations to determine the physical addresses for the request data. In addition, as previously described, each read context command may include at least a data transfer command, and in some examples, a pair of a sense command and a data transfer command. Generating the context commands may also include assigning one or more identifiers to the context commands to identify which host request that a context command is associated with and to uniquely identify the context command among the plurality of context commands that are associated with a single host command.

At block 1008, using the actual physical address information, the command generator may determine on which channels each of the read context commands are to be issued and then place each of the read context commands in appropriate back end queues. In some example methods, the read context commands may be queued in the back end queues along with context commands associated with other host commands, including other host read requests or program requests as examples.

At block 1010, a sequencer may receive a schedule from a scheduling module that indicates when to select data transfer commands associated with the host read request. As previously described, the schedule may be generated by a scheduler, which may consider the queue depth of the read request queue when selecting a scheduling scheme on which to base the schedule. If the queue depth is below a queue depth threshold, then the schedule may be generated according to a first scheduling scheme that prioritizes minimizing the response time in loading an initial data unit in the temporary storage area over maximizing channel throughput. Alternatively, if the queue depth is above a queue depth threshold, then the schedule may be generated according to a second scheduling scheme that prioritizes maximizing channel throughput over minimizing the response time in loading an initial data unit in the temporary storage area. In some example configurations, the schedule may include command chain information identifying one or more command chains to which the data transfer commands may be assigned.

At block 1012, the sequencer may select the data transfer commands from the queue based on the received schedule. For example, based on review of schedules received from scheduler, if the sequencer determines that a data transfer command is part of a current command chain, then the sequencer may select the data transfer command. Alternatively, if the sequencer determines that a data transfer command is not part of a current command chain (i.e., it is part of a later command chain), then the sequencer may refrain from or delay selecting the data transfer command. This latter situation may occur under the first scheduling scheme where even though a data transfer command may be the next command in a back end queue to be selected and an associated channel may be available, the data transfer command may be nonetheless part of a later command chain, and as such, the sequencer may refrain from selecting the data transfer command until that later command chain becomes the current command chain for selection. At block 1014, the selected data transfer commands may be issued on their associated channels, which may cause the memory dies to transfer the associated data units to the temporary storage area.

At block 1016, a front end module may determine that the initial data unit is loaded in the temporary storage area and ready to be transferred to the host system. Additionally, at block 1016, in response to the determination, the front end module may begin transferring the initial data unit to the host system. In some example methods, the front end module may do so even though all of the data units requesting to be read by the host read request are not stored in the temporary storage area and/or ready to be sent to the host system.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A non-volatile memory system comprising:
   non-volatile memory;
   a controller configured to:
      receive, from a host system, a host read request to read a set of data units, the set of data units comprising an initial data unit to be sent back to the host system before the other data units of the set are sent back to the host system;
      generate a schedule for transferring the set of data units from the non-volatile memory to a temporary storage area that temporarily stores the set of data units before the set of data units is sent back to the host system, wherein the schedule prioritizes the initial data unit over the other data units in the transfer of the set of data units from the non-volatile memory to the temporary storage area; and
      to generate the schedule, determine an amount to delay output of a first data transfer command of a set of data transfer commands after output of a second data transfer command of the set of data transfer commands based on back end queue depth information and physical address information identifying where in the non-volatile memory the set of data units is stored, the second data transfer command transferring the initial data set to the temporary storage area; and
      output the set of data transfer commands to the non-volatile memory to have the set of data units transferred from the non-volatile memory to the temporary storage area according to the schedule, wherein output of the data transfer commands according to the schedule comprises:
         delay output of the first data transfer command by the amount after output of the second data transfer command.

2. The non-volatile memory system of claim 1, wherein the temporary storage area is configured to store the initial data unit before storing the other data units based on the output of the set of data transfer commands according to the schedule.

3. The non-volatile memory system of claim 1, wherein the non-volatile memory is configured to transfer to the temporary storage area the initial data unit before the other data units in response to receipt of the set of data transfer commands.

4. The non-volatile memory system of claim 1, wherein the controller, according to the schedule, is configured to delay output of the first data transfer command on an available channel of a plurality of channels in order to prioritize the transfer of the initial data unit.

5. The non-volatile memory system of claim 4, wherein the available channel comprises a first channel,
   wherein the controller is further configured to delay output of the first data transfer command on the first channel until after output of the second data transfer command on a second channel of the plurality of channels in accordance with the schedule.

6. The non-volatile memory system of claim 1, wherein the schedule comprises a first schedule, the system further comprising:
   a read request queue configured to queue the host read request,
   wherein the controller is configured to determine a queue depth of the read request queue relative to a queue depth threshold;
   in response to the queue depth being below the queue depth threshold, generate the first schedule, and
   in response to the queue depth being above the queue depth threshold, generate a second schedule that prioritizes maximizing channel throughput in the transfer of the set of data units from the non-volatile memory to the temporary storage area.

7. The non-volatile memory system of claim 1, wherein the controller is configured to send the initial data unit back to the host system while at least some of the other data units have yet to be transferred to the temporary storage area.

8. A method of a non-volatile memory system responding to a host read request, the method comprising:
   generating, with a scheduler of a controller, a schedule to transfer a set of data units associated with a host read request from non-volatile memory to a temporary storage area as a first schedule or a second schedule based on a queue depth of a read request queue relative to a queue depth threshold associated with the read request queue, wherein the first schedule schedules an initial data unit of the set of data units to be transferred to the temporary storage before the other data units of the set, regardless of availability of a plurality of channels used to transfer the set of data units, and wherein the second schedule prioritizes maximizing channel throughput in the transfer of the set of data units from the non-volatile memory to the temporary storage area;
   sending, with the scheduler, the schedule to a sequencer of the controller;
   in response to receiving the schedule, outputting, with the sequencer, a set of data transfer commands to the non-volatile memory in order to have the set of data units transferred to the temporary storage area according to the schedule, wherein outputting the set of data units according to the schedule comprises:
  delaying, with the sequencer, output of a first data transfer command of the set of data transfer commands on an available channel of the plurality of channels to the non-volatile memory; and
  in response to the delaying, outputting a second data transfer command of the set of data transfer commands to the non-volatile memory.

9. The method of claim 8 wherein, in response to generating the schedule as the first schedule, delaying, with the sequencer, output of a first data transfer command of the set of data transfer commands on a first channel of the plurality of channels until after output of a second data transfer command of the set of data transfer commands on a second channel of the plurality of channels according to the schedule.

10. The method of claim 9, further comprising:
  receiving, with the scheduler, physical address information identifying where in the non-volatile memory the data units are being stored and back end queue depth information; and
  determining, with the scheduler, how much to delay output of the first data transfer command based on the physical address information and the back end queue depth information.

11. The method of claim 8, wherein the schedule comprises a first schedule, the method further comprising:
  queuing, with the read request queue, the host read request;
  determining, with the scheduler, the queue depth of the read request queue relative to the queue depth threshold associated with the read request queue;
  in response to the queue depth being below the queue depth threshold, generating, with the scheduler, the schedule as the first schedule, and
  in response to the queue depth being above the queue depth threshold, generating, with the scheduler, the schedule as the second schedule.

12. The method of claim 8, further comprising:
  sending, with an interface of the controller, the initial data unit back to the host system while at least some of the other data units have yet to be transferred to the temporary storage area.

13. A non-volatile memory system comprising:
  non-volatile memory configured to store a set of data units requested to be read by a host read request, the set of data units comprising an initial data unit to be transferred to a host system before the other of the plurality of data units in order for the host read request to be executed;
  a controller configured to:
    generate a schedule for transferring the set of data units from the non-volatile memory to a temporary storage area according to a first scheduling scheme when a queue depth level of a host read request queue is lower than a queue depth threshold; and
    generate the schedule according to a second scheduling scheme when the queue depth level of the host read request queue is higher than the queue depth threshold,
  wherein the first scheduling scheme prioritizes minimizing response time in transferring the initial data unit to the temporary storage area over maximizing channel throughput for the transfer of the set of data units to the temporary storage area, and
  wherein the second scheduling scheme prioritizes maximizing channel throughput over minimizing the response time in transferring the initial data unit.

14. The non-volatile memory system of claim 13, wherein the non-volatile memory is configured to transfer to the temporary storage area the initial data unit before the other data units in response to receipt of a set of data transfer commands when the schedule is generated according to the first scheduling scheme.

15. The non-volatile memory system of claim 13, wherein the controller is further configured to issue the a set of data transfer commands to transfer the set of data units from the non-volatile memory to the temporary storage area, wherein the schedule causes the controller to delay issuance of a data transfer command for transfer of one of the other data units on an available channel when the schedule is generated according to the first scheduling scheme.

16. The non-volatile memory system of claim 15, wherein the data transfer command comprises a first data transfer command and the available channel comprises a first channel of a plurality of channels, and wherein the plurality of channels comprises a second channel on which to issue a second data transfer command for the transfer of the initial data unit from the non-volatile memory to the temporary storage area,
  wherein the controller is configured to delay issuance of the first data transfer command on the first channel until after the issuance of the second data transfer command on the second channel when the schedule is generated according to the first scheduling scheme.

17. The non-volatile memory system of claim 16, wherein the controller is further configured to:
  determine which of the plurality of channels to utilize for the transfer of the set of data units in response to receipt of physical address information identifying where in the non-volatile memory the data units are located;
  determine back end queue depth information; and
  to generate the schedule, determine how much to delay issuance of the first data transfer command on the first channel based on the physical address information and the back end queue depth information when the schedule is generated according to the first scheduling scheme.

18. The non-volatile memory of claim 13, wherein the controller is further configured to send the initial data unit back to the host system while at least some of the other data units have yet to be transferred to the temporary storage area.

* * * * *